(12) United States Patent
Witzig

(10) Patent No.: US 6,737,820 B2
(45) Date of Patent: May 18, 2004

(54) ELECTRONICALLY COMMUTATED MULTI-PHASE SYNCHRONOUS MACHINE

(75) Inventor: Harald Witzig, Cheongwon-Gun (KR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/332,218
(22) PCT Filed: Mar. 16, 2002
(86) PCT No.: PCT/DE02/00969
§ 371 (c)(1),
(2), (4) Date: Mar. 25, 2003
(87) PCT Pub. No.: WO02/091557
PCT Pub. Date: Nov. 14, 2002

(65) Prior Publication Data
US 2003/0155884 A1 Aug. 21, 2003

(30) Foreign Application Priority Data
May 4, 2001 (DE) .......................... 101 21 767

(51) Int. Cl.[7] .............................................. H02P 3/08
(52) U.S. Cl. ..................... 318/254; 318/439; 318/138
(58) Field of Search ................... 318/138, 254, 318/439

(56) References Cited

U.S. PATENT DOCUMENTS

| | | | | |
|---|---|---|---|---|
| 4,162,435 A | * | 7/1979 | Wright ........................ | 318/138 |
| 4,250,435 A | * | 2/1981 | Alley et al. ................. | 318/138 |
| 4,532,458 A | * | 7/1985 | Kuznetsov et al. .......... | 318/111 |
| 4,743,828 A | * | 5/1988 | Jahns et al. ................. | 318/810 |
| 5,751,128 A | * | 5/1998 | Chalupa et al. ............. | 318/439 |

FOREIGN PATENT DOCUMENTS

| | | |
|---|---|---|
| DE | 40 40 926 | 4/1992 |
| DE | 43 43 012 | 6/1995 |
| EP | 0 802 613 | 10/1997 |

OTHER PUBLICATIONS

K. M. Richardson et al., "Design and Performance of a Rotor Position Sensing System for a Switched Reluctance Marine Propulsion Unit," IAS '96, Conference Record of the 1996 IEEE Industry Applications Conference, 31st IAS Annual Meeting, San Diego, CA, Oct. 6–10, 1996, Conference Record of the IEEE Industry Applications Conference Annual Meeting (IAS), New York, IEEE, US, Bd. 1 Meeting 31, pp. 168–173, XP000691648, ISBN: 0–7803–3545–7, pp. 170.

* cited by examiner

Primary Examiner—Rina I Duda
(74) Attorney, Agent, or Firm—Kenyon & Kenyon

(57) ABSTRACT

An electronically commutated polyphase synchronous machine has a rotor (13) and a stator (14) which carries a stator winding (15); the stator has a switching device (10) having a plurality of semi-conductor switches (T1–T6) which are assigned to the individual winding phases (151–153) of the stator winding (15); the switching device is used for connecting the stator winding (15) to a direct voltage system (11), and a commutation device (17) for sequential triggering of the semiconductor switches (T1–T6) using switching signals which are derived from rotor angular position signals. For sensorless detection of the angular position of the rotor, auxiliary windings (181–183) are situated in the stator (14), which are each inductively coupled to a winding phase (151–153), and the rotor angular position signals are derived from voltages induced in the auxiliary windings (181–183).

8 Claims, 2 Drawing Sheets

ELECTRONICALLY COMMUTATED MULTI-PHASE SYNCHRONOUS MACHINE

BACKGROUND INFORMATION

Figure 1:
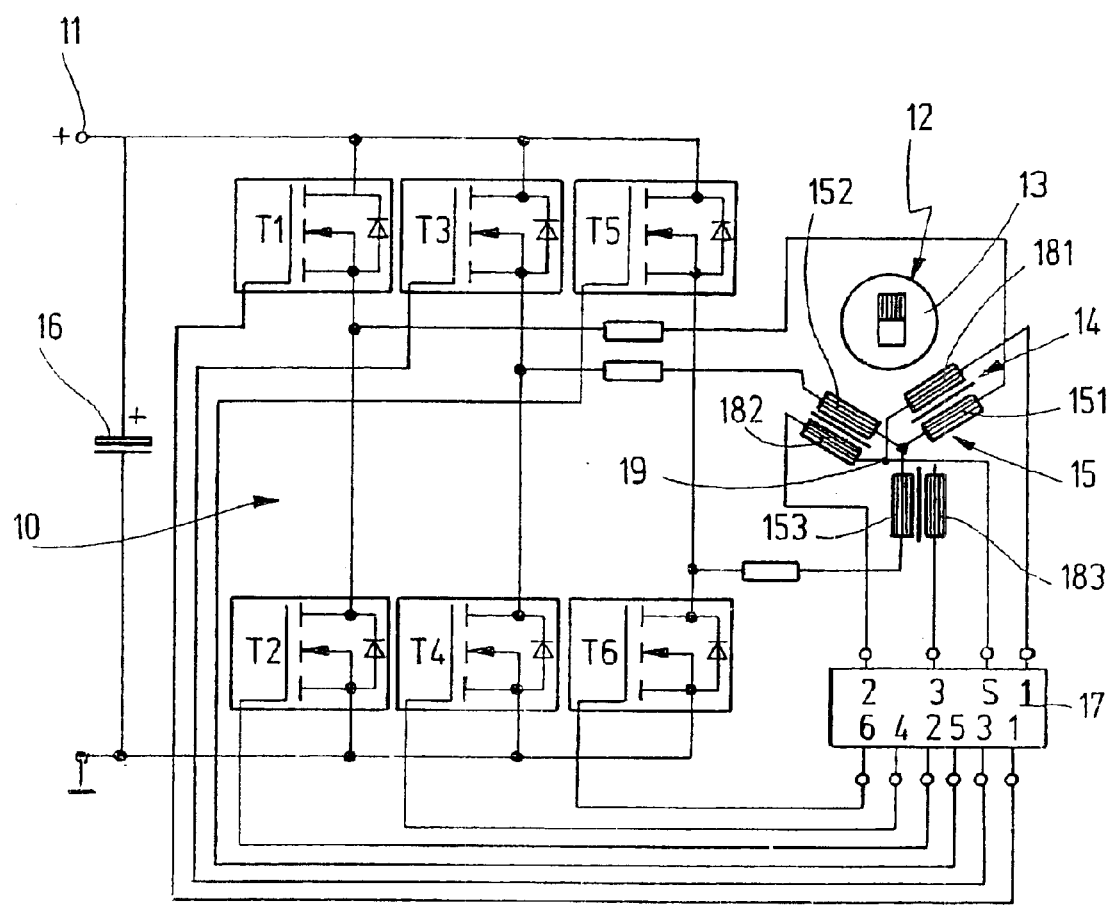

The present invention is directed to an electronically commutated polyphase synchronous machine as recited in the preamble of claim 1.

In a known three-phase synchronous motor, also called EC motor (German Patent 40 40 926 C1), the stator winding is designed as a star connection whose star point is connected to the positive potential of the direct voltage system. The circuit device for operating the synchronous motor has three power transistors designed as MOSFETs (metal-oxide semiconductor field-effect transistors) which are connected in series with a winding phase of the stator winding, the drains being connected to the associated winding phase and the sources being connected to the lower potential, i.e., the ground potential of the direct voltage system, via a common resistor. The switching signals, generated by the commutation device, are applied to the gates of the power MOSFETs forming the difference with a reference voltage picked off at the resistor. For the rotor position query, three position sensors are provided which generate output signals according to the angular position of the rotor, the output signals being electrically converted in a gate circuit into a three-phase signal without overlap, with a pitch of 120°. The three-phase signal is supplied to the commutation device which generates the above-mentioned switching signals for the power transistors, the signals being composed of a sequence of periodic square-wave pulses.

ADVANTAGES OF THE INVENTION

The electronically commutated polyphase synchronous machine according to the present invention having the features as recited in claim 1 has the advantage of a sensorless detection of the angular position of the rotor, which is very attractive from a cost standpoint. The analysis of the voltage, induced in the at least one auxiliary winding, for obtaining information concerning the angular position of the rotor not requiring a complex circuitry is possible in a simple way.

The insertion of only one auxiliary winding into the stator, and its assignment to a winding phase, delivers only one rotor position information per electric revolution of the synchronous machine, which is frequently sufficient for drives having low dynamics requirements. For a higher dynamics requirement an auxiliary winding is added to each winding phase, so that the switching signals for each winding phase of the stator winding are synchronized with the angular position of the rotor, thus, in a three-phase synchronous machine synchronization takes place electrically during each angular displacement of the rotor by 120°.

The measures listed in the subsequent claims make advantageous refinements of and improvements on the synchronous machine mentioned in claim 1 possible.

According to an advantageous embodiment of the present invention, each auxiliary winding is assigned a zero crossing detector which detects when the voltage induced in each auxiliary winding exceeds or drops below a reference potential and outputs it as a rotor angular position signal. The reference potential is preferably ground, but it may also be adjusted in a defined manner using a reference voltage source.

According to an advantageous embodiment of the present invention, each auxiliary winding is manufactured from a winding wire having a small cross section. Thus, the auxiliary windings require only little winding space in the stator. The small wire cross section or wire diameter is possible since only minimum currents flow in the auxiliary windings.

According to an advantageous embodiment of the present invention, the auxiliary windings are wound with a number of turns as large as possible, resulting in an increased amplitude of the induced voltages and a better analysis of the same.

DRAWING

The present invention is explained in greater detail in the following description on the basis of the drawing of an exemplary embodiment.

Figure 2:
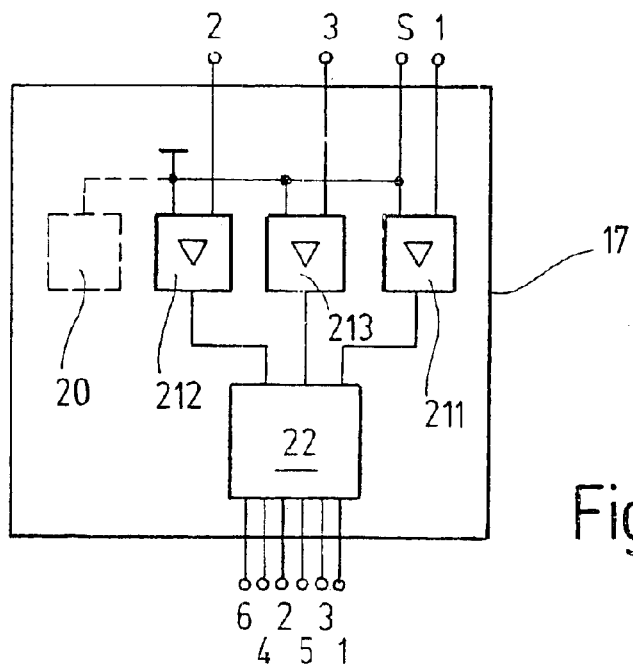
Figure 3:
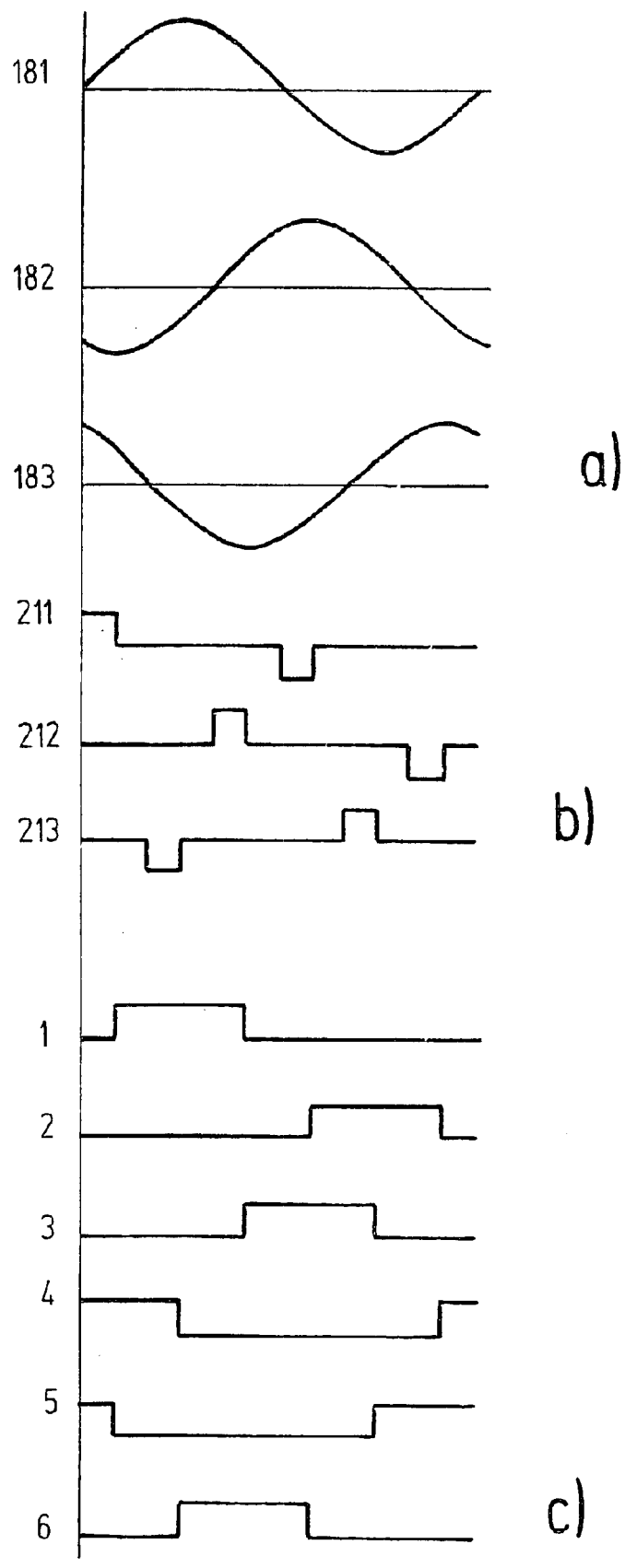

FIG. 1 shows a block diagram of an electronically commutated three-phase synchronous motor, FIG. 2 shows a block diagram of the commutation device in FIG. 1, FIG. 3 shows a diagram of different signals in the commutation device of the synchronous machine according to FIG. 1.

DESCRIPTION OF THE EXEMPLARY EMBODIMENT

The electronically commutated three-phase synchronous motor in FIG. 1, referred to in the following as EC motor 12, operated in connection with a switching device 10 in a direct voltage system 11, as an exemplary embodiment of a general electronically commutated polyphase synchronous machine has a rotor 13 excited by a permanent electromagnet, and a stator 14 having a stator winding 15 in the form of a star connection whose three winding phases 151, 152, 153 are electrically staggered with respect to one another by 120° on the perimeter of stator 14.

Switching device 10 has a total of six power transistors T1–T6 designed as MOSFETs as an exemplary embodiment of semiconductor switches in general, of which in each case two power transistors T1, T2, or T3, T4, or T5, T6 are connected in series. In each case, their common connecting point is placed on one of the winding terminals of stator winding 15. The three series connections of power transistors T1–T6 are connected in parallel, the parallel connection is connected to direct voltage system 11, and a capacitor 16 is connected in parallel to the parallel circuit. Power transistors T1–T6 are triggered by a commutation device 17, the switching signals generated by commutation device 17 being applied to the control inputs of power transistors T1–T6, i.e., to the gates of the MOSFETs. The switching signals are formed by commutation device 17 as a function of rotor angular position signals, which deliver information about the instantaneous angular position of rotor 13 of EC motor 12.

Three auxiliary windings 181, 182, and 183 are situated in stator 14 of EC motor 12 for generating the rotor angular position signals. Each of auxiliary windings 181–183 is assigned to one of winding phases 151–153 of stator winding 15 and is inductively coupled to the same. The first ends of auxiliary windings 181–183 are connected to a common star point 19 and the other ends of auxiliary windings 181–183 are connected to commutation device 17. Star point 19 is also connected to commutation device 17. Each auxiliary winding 181–183 is manufactured from a winding wire having a small cross section, thus requiring little assembly space. Auxiliary winding 181–183 is also designed having a number of turns as large as possible, in order to increase the amplitude of the voltage being induced in auxiliary windings 181–183. The rotor angular position signals are derived from the induced voltages of auxiliary windings 181–183 in commutation device 17, and the switching signals for power transistors T1–T6 are formed by using the rotor angular position signals.

Commutation device 17 is illustrated in more detail in the block diagram in FIG. 2. Auxiliary windings 181, 182, 183 and star point 19 are connected to inputs 1, 2, 3, and S of commutation device 17. Each of inputs 1, 2, and 3 is connected to one of two inputs of three zero crossing detectors 211, 212, and 213, to whose other input a reference potential, e.g., ground potential, is applied. Star point 19 of auxiliary windings 181–183 is connected to this reference potential via input S. Alternatively, this fixed reference potential may be picked off from a reference voltage source 20, which is depicted in FIG. 2 in the form of a broken line. It is detected in each zero crossing detector 211–213 assigned to an auxiliary winding 181–183, when the voltage induced in the corresponding auxiliary winding 181–183 exceeds or drops below the reference potential, the result being output at the output terminal of zero crossing detector 211–213 as a rotor angular position signal. The rotor angular position signals are supplied to a trigger pulse generator 22 in which the trigger pulses are synchronized with the rotor angular position signals so that the individual switching signals for power transistors T1–T6 appear at output terminals 1–6 of commutation device 17 in the right sequence. The generating of switching signals in commutation device 17 is illustrated in the diagrams of FIG. 3. Diagram a shows the voltages induced in auxiliary windings 151–153 applied to inputs 1, 2, and 3 of commutation device 17, diagram b shows the rotor angular position signals generated by zero crossing detectors 211–213, and diagram c shows the switching signals for power transistors T1–T6 which may be picked off at output terminals 1–6 of commutation device 17, in each case over one revolution of 360 electrical degrees of rotor 13.

The present invention is not limited to the previously described exemplary embodiment of an electronically commutated three-phase synchronous motor. It is also possible that only one auxiliary winding, which is inductively coupled to only one winding phase, is provided in the stator. Here only one piece of rotor angular position information per electric revolution is obtained, which, however, is frequently sufficient for drives having low dynamics requirements. The full or divided line voltage of direct voltage system 11 may be used as reference potential for the zero crossing detectors. Furthermore, the design of the stator winding of the synchronous machine is not limited to three winding phases.

What is claimed is:

1. An electronically commutated polyphase synchronous machine, comprising:

a rotor;

a stator including a stator winding, the stator winding, including a plurality of winding phases;

a switching device configured to connect the stator winding to a direct voltage system, wherein the switching device includes a plurality of semiconductor switches assigned to individual ones of the winding phases;

a commutation device configured to sequentially trigger tie semiconductor switches using switching signals formed as a function of rotor angular position signals indicating an angular position of the rotor; and at least one auxiliary winding inductively coupled to at least one of the winding phases and situated in the stator, wherein a voltage induced in the at least one auxiliary winding is used to derive the rotor angular position signals.

2. The synchronous machine according to claim 1, wherein:

each of the at least one auxiliary winding is assigned to each winding phase, a first end of each of the at least one auxiliary winding is connected to a star point, and the voltage induced in the at least one auxiliary winding is picked off between another end of the at least one auxiliary winding and the star point.

3. The synchronous machine according to claim 1, further comprising:

a zero crossing detector assigned to each of the at least one auxiliary winding and for detecting when the voltage induced in the at least one auxiliary winding one of exceeds and drops below a reference potential, the zero crossing detector outputting the voltage respectively as one of the rotor angular position signals.

4. The synchronous machine according to claim 3, wherein a star point of the at least one auxiliary winding is connected to a reference potential.

5. The synchronous machine according to claim 3, wherein the reference potential is picked off from one of a positive pole and a ground pole of the direct voltage system.

6. The synchronous machine according to claim 3, wherein the reference potential is picked off from a reference voltage source.

7. The synchronous machine according to claim 1, wherein each of the at least one auxiliary winding is manufactured from winding wire having a small wire cross section.

8. The synchronous machine according to claim 1, wherein each of the at least one auxiliary winding includes as large a number of turns as possible.

* * * * *

UNITED STATES PATENT AND TRADEMARK OFFICE
CERTIFICATE OF CORRECTION

PATENT NO.    : 6,737,820 B2
DATED         : May 18, 2004
INVENTOR(S)   : Harold Witzig It is certified that error appears in the above-identified patent and that said Letters Patent is hereby corrected as shown below:

Title page,
Item [57], ABSTRACT,
Line 2, change "has" to -- with --
Delete "(13) (14) (15) (10) (T1-T6) (151-153) (15) (15) (11) (17) (T1-T6) (181-183) (14) (151-153) (181-183)"

Column 1,
Line 5, change "BACKGROUND INFORMATION" to -- FIELD OF THE INVENTION --
Lines 7-8, change "machine as...claim 1." to -- machine. --
Line 9, change "known" to -- conventional --
Line 9, change "called" to -- called an --
Line 10, delete "German Patent 40 40 926 C1"
Line 12, change "voltage system." to -- voltage system. See, for example, German Patent No. 40 40 926. --
Line 33, change "ADVANTAGES" to -- SUMMARY --
Lines 35-36, change "having the features as recited in claim 1 has the advantage of" to -- includes --
Line 38, change "is very" to -- may be --
Line 49, change "is" to -- may be --
Lines 55-57, delete "The measures...claim 1 possible. --
Line 58, delete "advantageous"
Line 66, change "an advantageous" to -- another --

Column 2,
Line 5, change "an advantageous" to -- anther --
Line 12, change "DRAWING" to -- BRIEF DESCRIPTION OF THE DRAWINGS --
Lines 13-15, delete "The present...embodiment"
Line 16, change "an electronically" to -- an example embodiment of an electronically --
Line 17, change "motor." to -- motor according to the present invention. --
Line 19, change "1," to -- 1. --
Lines 24-25, change "DESCRIPTION OF THE EXEMPLARY EMBODIMENT" to -- DETAILED DESCRIPTION --
Line 30, change "as" to -- is --
Line 31, change "machine" to -- machine. --
Line 32, change "has a" to -- EC motor 12 has a --
Lines 42 and 57, change "is" to -- may be --
Line 63, change "19 is also connected" to -- 19 may also be connected --

UNITED STATES PATENT AND TRADEMARK OFFICE
CERTIFICATE OF CORRECTION

PATENT NO. : 6,737,820 B2
DATED : May 18, 2004
INVENTOR(S) : Harold Witzig

It is certified that error appears in the above-identified patent and that said Letters Patent is hereby corrected as shown below:

Column 3,
Line 35, change "T1-T6" to -- T1-T6, --
Line 45, change "which, however, is" to -- which is --

Column 4,
Line 3, change "winding;" to -- winding --
Line 10, change "tie" to -- the --

Signed and Sealed this

Tenth Day of May, 2005

JON W. DUDAS
*Director of the United States Patent and Trademark Office*